(12) United States Patent
Depaoli

(10) Patent No.: US 8,338,770 B2
(45) Date of Patent: Dec. 25, 2012

(54) VERTICAL SOLAR PANEL ARRAY AND METHOD

(76) Inventor: Michael Thomas Depaoli, Scottsdale, AZ (US)

( * ) Notice: Subject to any disclaimer, the term of this patent is extended or adjusted under 35 U.S.C. 154(b) by 493 days.

(21) Appl. No.: 12/714,058

(22) Filed: Feb. 26, 2010

(65) Prior Publication Data
US 2010/0236604 A1    Sep. 23, 2010

Related U.S. Application Data

(60) Provisional application No. 61/156,635, filed on Mar. 2, 2009.

(51) Int. Cl.
*H01L 31/042* (2006.01)
*F24J 2/38* (2006.01)

(52) U.S. Cl. ............. 250/203.4; 136/246; 126/601; 126/605

(58) Field of Classification Search .......... 250/203.4; 136/246; 126/601, 605
See application file for complete search history.

(56) References Cited

U.S. PATENT DOCUMENTS

| 4,316,448 A | * | 2/1982 | Dodge | 126/600 |
| 4,883,340 A | * | 11/1989 | Dominguez | 359/593 |
| 5,191,875 A | * | 3/1993 | Edling et al. | 126/576 |

* cited by examiner

*Primary Examiner* — Tony Ko
(74) *Attorney, Agent, or Firm* — Parsons & Goltry; Robert A. Parsons; Michael W. Goltry

(57) ABSTRACT

A vertical solar panel array including a portable base with a rotatable surface and a plurality of double-sided solar panels each having a plurality of solar cells mounted on each side thereof. The plurality of double-sided solar panels are mounted vertically on the rotatable surface of the base. Electrical circuitry couples each solar cell of the plurality of solar cells to an output terminal. An electric motor is mechanically coupled between the base and the rotatable surface to provide rotation and a controller is coupled to the electric motor and to a light sensor. The controller is programmed to analyze readings from the light sensor and to control the electric motor to align the plurality of double-sided solar panels with the sun for maximum output.

20 Claims, 1 Drawing Sheet

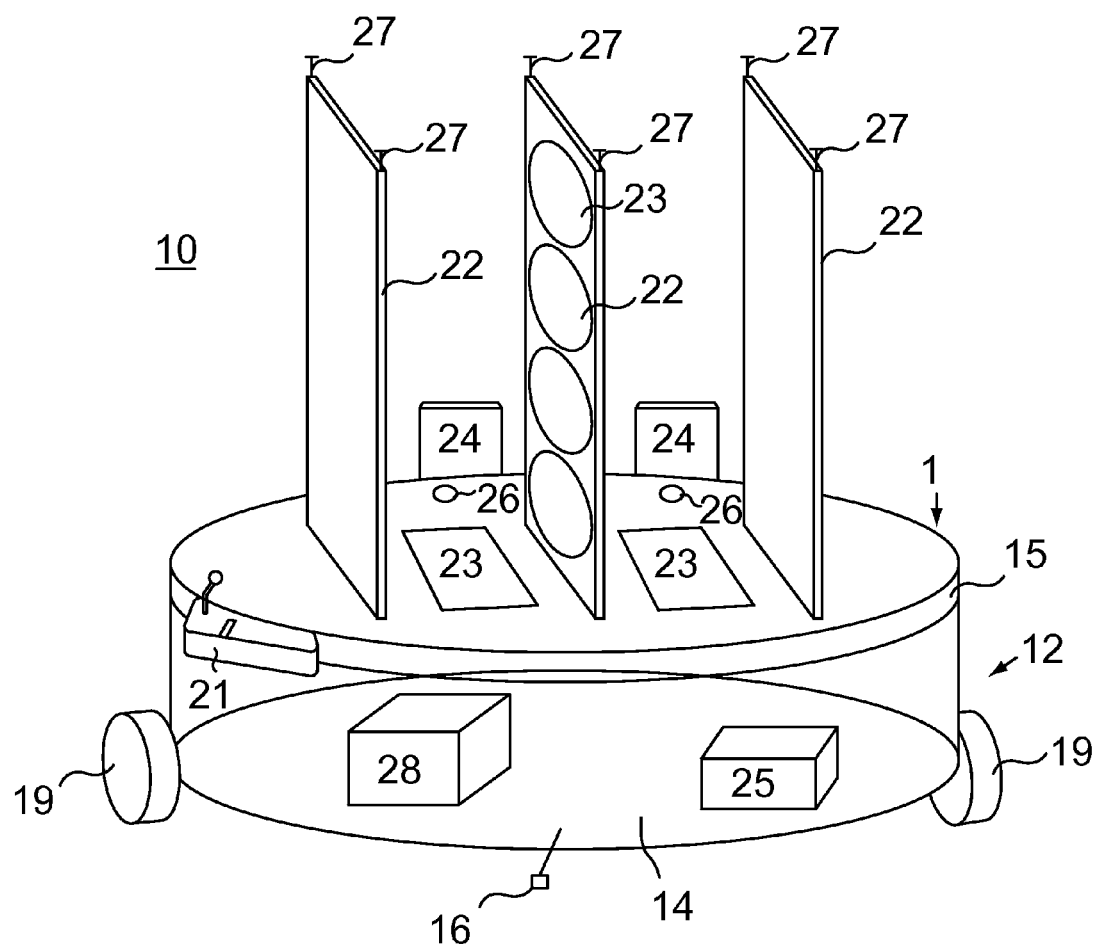

VERTICAL SOLAR PANEL ARRAY AND METHOD

CROSS-REFERENCE TO RELATED APPLICATIONS

This application claims the benefit of U.S. Provisional Application No. 61/156,635, filed 2 Mar. 2009

FIELD OF THE INVENTION

This invention relates to solar power generation.

More particularly, this invention relates to solar panel arrays.

BACKGROUND OF THE INVENTION

The present system and method is preferably for use in solar power generation. There exists a need for electricity to be generated by solar panels. There also exists a need for the solar panels to have a small footprint, in order to minimize the land needed for installation. At present, solar power generating stations are built on large tracts of land, with the panels spread out horizontally in order to maximize direct sun exposure on only one side of the flat horizontal solar panels. However, sometimes large tracts of land are not available, the land is expensive to purchase, or else the available large tracts of land are many miles from the existing power lines. Therefore, the horizontal solar arrays create installation problems. Also, once installed, the horizontal solar arrays cannot easily be moved.

It would be highly advantageous, therefore, to remedy the foregoing and other deficiencies inherent in the prior art.

An object of the present invention is to provide a new and improved vertical solar panel array.

Another object of the present invention is to provide a new and improved vertical double-sided solar panel array that maximizes land use.

Another object of the present invention is to provide a new and improved vertical solar panel array that is portable for easy deployment.

Another object of the present invention is to provide a new and improved vertical solar panel array designed to be used use in large units or individually.

SUMMARY OF THE INVENTION

Briefly, to achieve the desired objects of the instant invention in accordance with a preferred embodiment thereof, provided is a vertical solar panel array including a portable base with a rotatable surface and a plurality of double-sided solar panels each having a plurality of solar cells mounted on each side thereof. The plurality of double-sided solar panels are mounted vertically on the rotatable surface of the base. Electrical circuitry couples each solar cell of the plurality of solar cells to an output terminal. An electric motor is mechanically coupled between the base and the rotatable surface to provide rotation and a controller is coupled to the electric motor and to a light sensor. The controller is programmed to analyze readings from the light sensor and to control the electric motor to align the plurality of double-sided solar panels with the sun for maximum output.

The desired objects of the instant invention are further achieved in accordance with a preferred method of generating electricity including the step of providing a portable base including a rotatable surface and a plurality of double-sided solar panels including a plurality of solar cells mounted on each side of each double-sided solar panel of the plurality of double-sided solar panels. The method further includes the steps of mounting the plurality of double-sided solar panels vertically on the rotatable surface of the base, controlling the base to align the plurality of double-sided solar panels with the sun for maximum output, and coupling electrical energy from each solar cell of the plurality of solar cells to an output terminal.

BRIEF DESCRIPTION OF THE DRAWING:

Specific objects and advantages of the invention will become readily apparent to those skilled in the art from the following detailed description of a preferred embodiment thereof, taken in conjunction with the single drawing in which a preferred embodiment is illustrated of a vertical double-sided solar panel array in accordance with the present invention.

DETAILED DESCRIPTION OF A PREFERRED EMBODIMENT

The present invention solves some of the problems inherent with horizontal solar arrays by creating a vertical double-sided solar array that reduces the amount of land needed for installation. Also, the present vertical solar array invention allows for each unit to be transportable. In addition, the present vertical solar array invention allows for the units to be manufactured in a factory, in order to maximize quality control and to allow for easier installation in the field. Furthermore, the present vertical solar array invention allows for multiple double-sided solar arrays to be installed side-by-side in close proximity, because the shading effect would be minimized.

Turning now to the single FIGURE, a horizontal solar array 10 is illustrated. Basically, array 10 is a single-axis rotating horizontal sun tracker that rotates clockwise and/or counter-clockwise, allowing the solar panels to be continually aligned with the sun's rays to maximize generation of electricity. Rotation ensures that solar radiation is continually directed onto the solar panels for maximum energy absorption. Also, the rotation reduces any shadow effects caused by array 10, either on itself or on adjacent arrays, so that other units can be installed in close proximity.

Solar array 10 includes a base, generally designated 12, having a lower fixed portion 14 and an upper portion 15 rotatably mounted on a single vertical axis on lower portion 14. Base 12 is depicted as round in this example for rotation purposes (explained below) but it will be understood that virtually any desired configuration could be devised, including for example square or rectangular (including rotatable portions) for easy deployment. Also, in this specific example lower portion 14 includes two or more wheels 19 to facilitate movement to and from positions to be deployed. Wheels 19 provide easy movement and placement for solar array 10 as, for example, part of a trailer unit that allows solar array 10 to be towed and transported. A trailer hitch 16 is connected to lower portion 14 of base 12 as part of a trailer unit that would allow one or more solar arrays 10 to be towed and transported.

Solar array 10 includes two or more double-sided solar panels 12 (in this specific example 3) vertically mounted in spaced apart orientation on the upper surface of upper portion 15 of base 22. Each vertical solar panel 22 includes a plurality of solar cells 23 on each of the double sides, such as the well known silicon solar cells presently available in the industry. Generally, it is anticipated that the height of vertical solar panels 12 exceeds the diameter of upper portion 15 of base 12.

Also, the plurality of solar cells 23 are interconnected electrically within each panel 22 in a well known manner. Support structure 27 is optionally provided at the top of each vertical solar panel 22 so that additional double sided vertical panels (not shown, but similar to panels 22) can be installed, in an upwardly directed orientation, once solar array 10 is positioned on location. It will be understood that support structure 27 includes some type of plug-in electrical connection to couple the additional double sided vertical panels electrically with solar panels 22.

One or more generally horizontally mirrors 23 are positioned on the upper surface of upper portion 15 of base 12 beneath and between adjacent vertical solar panels 22 so that sunlight is reflected upwardly onto vertical solar panels 22. Mirrors 23 are angled slightly from the horizontal to maximize the amount of reflected light directed onto vertical double-sided solar panels 22. Also, one or more mirror back-panels 24 are positioned to reflect light back onto vertical double-sided solar panels 22. Mirror back-panels 24 are angled to maximize the amount of reflected light directed onto vertical double-sided solar panels 22. Also, mirror back-panels 24 are preferably limited in height in order to reduce any shadowing effect on other solar arrays 10 that might be installed behind or nearby. It will be understood that in some instances aligning one of the sides of double sided solar panels 22 with the sun may limit the amount of sun directed onto the opposite side. Horizontally mirrors 23 and mirror back-panels 24 may be used to alleviate this problem. Alternatively, either or both generally horizontally mirrors 23 and mirror back-panels 24 can be replaced by or include additional solar cells similar to those included in solar panels 22. It will be understood that a mirror can be any surface that reflects light, including all conventional mirrors as well as metal foils and the like.

Batteries, capacitors, transformers, or other electrical devices, generally depicted as box 25, to allow generated electricity to be stored or communicated to a desired electrical terminal or conduit are mounted within lower portion 14 of base 12. If solar array 10 is included in a larger arrangement (i.e. multiple solar arrays 10) for the general generation of power, it will be connected into a power grid through box 25. If, on the other hand, solar array 10 is utilized as a single or in a smaller arrangement (private or semi-private) it can be connected directly to the desired electrical terminal or terminals through box 25. Box 25 can be connected to solar panels 22 in a variety of well known ways including slip-rings and other moving contacts. Alternatively, since the rotation of upper portion 15 relative to lower portion 14 to maintain solar panels 22 pointed in the optimum direction for solar collection is only a limited amount (i.e. 180° or less), the electrical connection of solar panels 22 to box 25 can be a fixed or plug connection. Box 25 and the various connections communicating electrical energy to the outside can be provided in a large number of variations and is herein referred to generically as "electrical circuitry . . . coupling electrical energy to a terminal".

A small electric motor, designated 21 is operatively coupled between lower portion 14 and upper portion 15 of base 12. Motor 21 rotates upper portion 15 relative to lower portion 14 about a common central vertical axis. Because sufficient rotation to cause solar panels 22 to receive maximum solar energy throughout the day is very slow, motor 21 can be very small and powered by batteries and/or by a small amount of electricity from box 25. Also, one or more light sensors 26 are mounted on the upper surface of upper portion 15 of base 12 in a convenient location (e.g. between adjacent solar panels 22). A controller, such as a microprocessor, logic array, or the like, designated 28, is contained within lower portion 14 of base 12 and is electrically coupled to light sensors 26, solar panels 22, box 25, and motor 21. Controller 28 is programmed to analyze readings from light sensors 26 and analyze the electrical output, so that solar array 10 is rotated and properly aligned with the sun throughout the day to maximize the generation of electricity. Alternatively, controller 28 can be programmed to sense the amount of electricity generated by solar panels 22 and control motor 21 to maximize the output of electricity, rather than use separate light sensors. Thus, the term "light sensors" includes either separate light sensors or the monitoring of the solar panels when connected in the alternative fashion.

Box 25 and controller 28 preferably contain conversion apparatus (e.g. analog to digital converters and filters, vibrators, transformers, etc.) to convert the generated direct current electricity into alternating current, with plug-in outlets that would allow immediate use of the electricity in remote locations, such as construction sites or mountain cabins.

Thus, a new and improved vertical solar panel array includes a plurality of double-sided solar panels that are rotated on a single axis for maximum generation of electricity. The new and improved vertical solar panel array can be manufactured and assembled in a factory for maximum efficiency and can be moved to a desired sight by truck (e.g. loaded/unloaded with forklift or the like), by trailing on its wheels, or by any other convenient means. The double-sided vertical oriented solar panels make the maximum use of land (e.g. minimum footprint) and provide a maximum electrical power out for a minimum space. Also, the new and improved vertical solar panel array is portable for easy deployment to virtually any desired location with a minimum of effort. Further, the new and improved vertical solar panel array is designed to be used use in large arrangements of many arrays or individually as a small arrangement (e.g. private) with one or more single arrays.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

1. A vertical solar panel array comprising:
   a base including a rotatable surface;
   a plurality of double-sided solar panels including a plurality of solar cells mounted on each side of each double-sided solar panel of the plurality of double-sided solar panels, the plurality of double-sided solar panels mounted vertically on the rotatable surface of the base;
   electrical circuitry coupled to each solar cell of the plurality of solar cells and coupling electrical energy from the solar cells to a terminal;
   an electric motor mechanically coupled between the base and the rotatable surface; and
   a controller coupled to the electric motor and to a light sensor and positioned in the base, the controller programmed to analyze readings from the light sensor and to control the electric motor to align the plurality of double-sided solar panels with the sun for maximum output.

2. A vertical solar panel array as claimed in claim 1 and further including at least one of horizontal mirrors and mirror back-panels mounted on the rotatable surface of the base and positioned to direct sunlight onto the plurality of double-sided solar panels.

3. A vertical solar panel array as claimed in claim 1 wherein the base is designed to be portable.

4. A vertical solar panel array as claimed in claim 3 wherein the base includes ground engaging wheels.

5. A vertical solar panel array as claimed in claim 3 wherein each double-sided solar panel of the plurality of double-sided solar panels includes support structure positioned at an upper end thereof, the support structure designed to receive and support an additional solar panel array.

6. A vertical solar panel array as claimed in claim 1 further including conversion apparatus designed to convert generated direct current electricity into alternating current electricity.

7. A vertical solar panel array as claimed in claim 6 wherein the conversion apparatus includes one of an analog to digital converter and filter, a vibrator and filter, and transformers.

8. A vertical solar panel array as claimed in claim 1 wherein the controller includes one of a microprocessor and a logic array.

9. A vertical solar panel array comprising:
  a portable base including a rotatable surface;
  a plurality of double-sided solar panels including a plurality of solar cells mounted on each side of each double-sided solar panel of the plurality of double-sided solar panels, the plurality of double-sided solar panels mounted vertically on the rotatable surface of the base;
  at least one of horizontal mirrors and mirror back-panels mounted on the rotatable surface of the base and positioned to direct sunlight onto the plurality of double-sided solar panels;
  electrical circuitry coupled to each solar cell of the plurality of solar cells and coupling electrical energy from the solar cells to a terminal;
  conversion apparatus coupled to the electrical circuitry, the conversion apparatus designed to convert generated direct current electricity into alternating current electricity at the terminal;
  an electric motor mechanically coupled between the base and the rotatable surface; and
  a controller coupled to the electric motor and to a light sensor and positioned in the base, the controller programmed to analyze readings from the light sensor and to control the electric motor to align the plurality of double-sided solar panels with the sun for maximum output.

10. A vertical solar panel array as claimed in claim 9 wherein the base includes ground engaging wheels.

11. A vertical solar panel array as claimed in claim 9 wherein each double-sided solar panel of the plurality of double-sided solar panels includes support structure positioned at an upper end thereof, the support structure designed to receive and support an additional solar panel array.

12. A vertical solar panel array as claimed in claim 9 wherein the conversion apparatus includes one of an analog to digital converter and filter, a vibrator and filter, and transformers.

13. A vertical solar panel array as claimed in claim 9 wherein the controller includes one of a microprocessor and a logic array.

14. A method of generating electricity comprising the steps of:
  providing a portable base including a rotatable surface and a plurality of double-sided solar panels including a plurality of solar cells mounted on each side of each double-sided solar panel of the plurality of double-sided solar panels;
  mounting the plurality of double-sided solar panels vertically on the rotatable surface of the base;
  controlling the base to align the plurality of double-sided solar panels with the sun for maximum output; and
  coupling electrical energy from each solar cell of the plurality of solar cells to an output terminal.

15. A method as claimed in claim 14 including a step of positioning at least one of horizontal mirrors and mirror back-panels on the rotatable surface of the base to direct sunlight onto the plurality of double-sided solar panels.

16. A method as claimed in claim 14 including a step of converting generated direct current electricity into alternating current electricity at the output terminal.

17. A vertical solar panel array comprising:
  a plurality of double-sided solar panels including a plurality of solar cells mounted on each side of each double-sided solar panel of the plurality of double-sided solar panels, the plurality of double-sided solar panels mounted vertically;
  electrical circuitry coupled to each solar cell of the plurality of solar cells and coupling electrical energy from the solar cells to a terminal;
  mirror back-panels positioned to direct sunlight onto the plurality of double-sided solar panels.

18. A vertical solar panel array as claimed in claim 17 and further including a base wherein the base is designed to be portable.

19. A vertical solar panel array as claimed in claim 17 and further including a base wherein the base includes horizontal mirrors positioned to direct sunlight onto the plurality of double-sided solar panels.

20. A vertical solar panel array as claimed in claim 17, further including a base wherein the base includes horizontal single-sided solar panels positioned in between the vertical double-sided solar panels, electrical circuitry coupled to each single sided horizontal solar cell of the plurality of solar cells and coupling electrical energy from the solar cells to a terminal.

\* \* \* \* \*